(12) United States Patent
Pereira et al.

(10) Patent No.: US 11,876,929 B2
(45) Date of Patent: *Jan. 16, 2024

(54) SECOND LEVEL INTERACTIVE VOICE RESPONSE COMPONENT

(71) Applicant: Intermedia.net, Inc., Sunnyvale, CA (US)

(72) Inventors: Vladimir Pereira, Sunnyvale, CA (US); Larry Brown, Sunnyvale, CA (US); Joseph DeClara, Sunnyvale, CA (US)

(73) Assignee: Intermedia.net, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,305

(22) Filed: Jan. 23, 2023

(65) Prior Publication Data

US 2023/0224404 A1   Jul. 13, 2023

Related U.S. Application Data

(63) Continuation of application No. 17/507,483, filed on Oct. 21, 2021, now Pat. No. 11,563,849.

(51) Int. Cl.
*H04M 3/493* (2006.01)
*H04L 65/1104* (2022.01)
*H04M 3/51* (2006.01)

(52) U.S. Cl.
CPC ....... *H04M 3/4933* (2013.01); *H04L 65/1104* (2022.05); *H04M 3/5166* (2013.01); *H04M 2201/42* (2013.01); *H04M 2203/406* (2013.01)

(58) Field of Classification Search
CPC ............ H04M 3/4933; H04M 3/5166; H04M 2201/42; H04M 2203/406; H04L 65/1104
USPC ............ 379/218.01, 88.01, 201.01, 201.02, 379/265.01, 265.05, 265.11
See application file for complete search history.

(56) References Cited

U.S. PATENT DOCUMENTS

| 8,634,534 | B1 | 1/2014 | Brandt et al. |
| 8,903,073 | B2 | 12/2014 | Or-bach et al. |
| 11,563,849 | B1 | 1/2023 | Pereira et al. |
| 2015/0350427 | A1* | 12/2015 | Benway ............... H04M 3/493 379/88.01 |

OTHER PUBLICATIONS

"U.S. Appl. No. 17/507,483, Notice of Allowance dated Oct. 4, 2022", 9 pgs.

* cited by examiner

*Primary Examiner* — Thjuan K Addy
(74) *Attorney, Agent, or Firm* — Schwegman, Lundberg & Woessner, P.A.

(57) ABSTRACT

In an example embodiment, a solution is provided that introduces a second level IVR component controlled by a call control service that also controls a first IVR component. Controlling the IVR components using this call control service (which also interfaces with client software operated by a human agent) allows for data collected during the IVR sessions or during a live session with the human agent to be shared among the components. This also acts to eliminate the need for a traditional "transfer" of a call from a human agent to an IVR or vice versa, which would often be accompanied by audible clicks or beeps discernable to the caller.

20 Claims, 6 Drawing Sheets

SECOND LEVEL INTERACTIVE VOICE RESPONSE COMPONENT

PRIORITY APPLICATIONS

This application is a continuation of U.S. patent application Ser. No. 17/507,483, filed Oct. 21, 2021, the content of which is incorporated herein by reference in its entirety.

TECHNICAL FIELD

This application relates generally to interactive voice response (IVR) technology. More specifically, this application relates to a second level IVR component.

BACKGROUND

Many organizations utilize interactive voice response (IVR) technology to aid in communications with customers. IVR is an automated phone system technology that allows callers to access information via a voice response system of recorded messages without having to speak to a live agent, as well as to utilize menu options via touch tone keypad selection or speech recognition to have their call routed to specific departments.

Typically, an IVR component is invoked when a call is first received, allowing the caller to be led through a series of prompts to either perform automated tasks or to connect to an agent in the correct department. In the latter case, the call is passed from the IVR component to the agent. An issue arises, however, if that agent wishes to pass the call to another IVR. More particularly, while it is currently possible to pass a call to such a second IVR component by transferring the call, any data collected by the agent about the call (such as notes or caller ID) are lost during that transfer. This makes use cases where the agent is unwilling or unable to perform a certain task that could be performed via IVR, such as collect credit card information or perform third party identification, with the call then being passed back to the agent with the information collected, technically challenging to implement.

A further technical problem with existing IVR technology is that it is technically challenging to ensure data privacy for particular types of data from the call while not protecting the entire call in its entirety. It may be desirable or even legally required in some circumstances for certain types of data collected by an IVR component, such as credit card information, to be kept unavailable or unreadable to the human agents handling the calls and not stored with the calls themselves, which can remain non-private.

What is needed is a solution that overcomes these technical issues.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
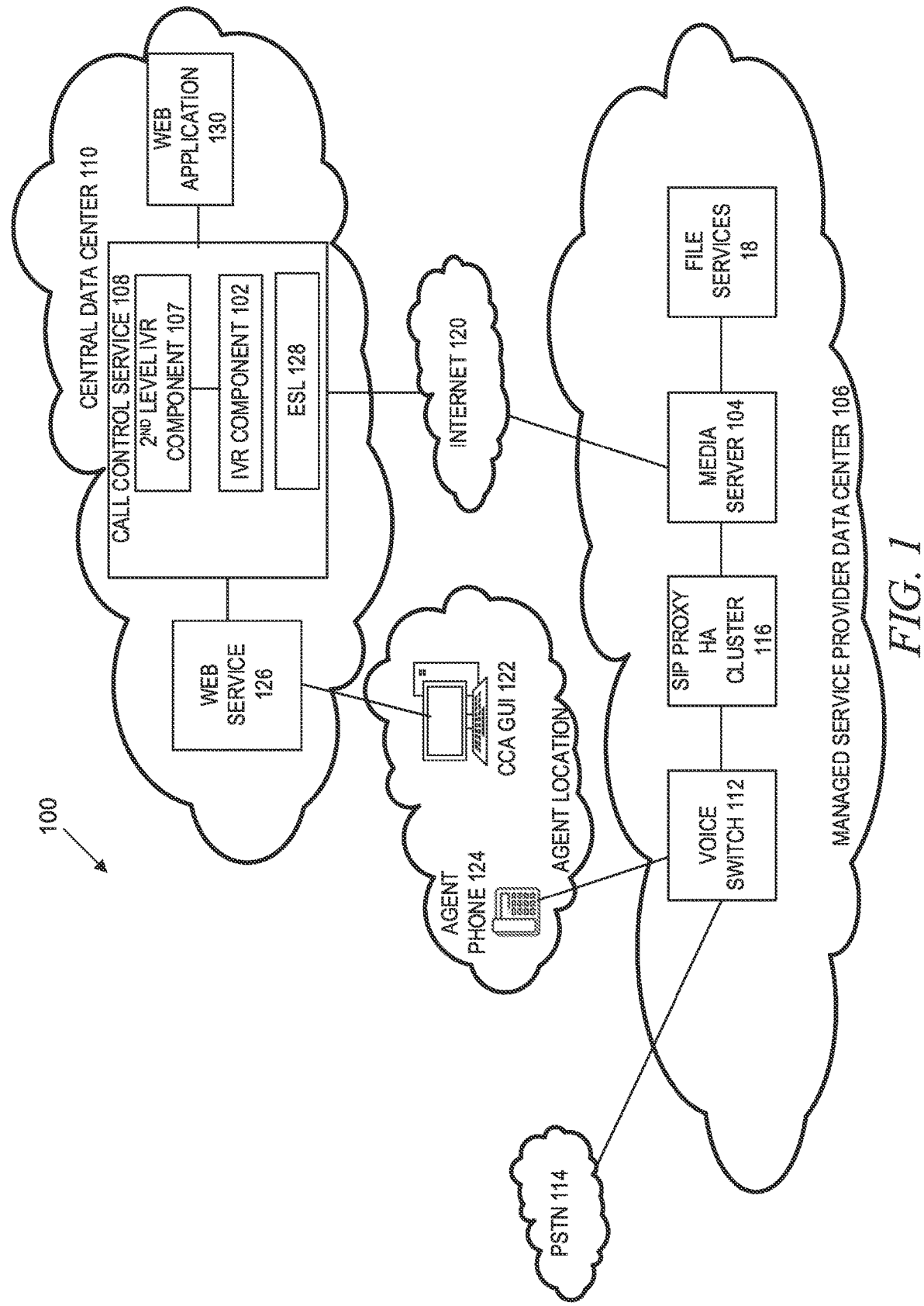
FIG. 1 is a block diagram illustrating a system for contact center deployment in accordance with an example embodiment.

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a solution is provided that introduces a second level IVR component controlled by a call control service that also controls a first IVR component. Controlling the IVR components using this call control service (which also interfaces with client software operated by a human agent) allows for data collected during the IVR sessions or during a live session with the human agent to be shared among the components. This also acts to eliminate the need for a traditional "transfer" of a call from a human agent to an IVR or vice versa, which would often be accompanied by audible clicks or beeps discernable to the caller.

The second level IVR component is designed specifically to persist the state of the call that was transferred to it. The second level IVR component can then transfer the call to a third IVR component to perform another IVR task, using the state that was persisted by the second level IVR.

Traditionally IVR components are associated with phone numbers, either assigned by a public switched telephone network (PSTN) or by a private branch exchange (PBX). Thus, when transferring calls, either from a human to a human or from a human to an IVR component, the human making the transfer would need to know the phone number (or extension) of the transferee. Thus, to the extent multiple IVR components were used in the past, they would each be assigned to a different phone number or extension, which would then need to be dialed in order to transfer call control over to the IVR component.

As described briefly earlier, it was also technically challenging to share data collected about a call (such as notes compiled by the human agent, or caller ID) with the IVR component following the transfer. More particularly, a complex mechanism would need to be established where a single IVR component was assigned multiple phone numbers, and which phone number that was dialed would indicate to the IVR component where data about the call was stored for retrieval, using a mapping.

The present solution overcomes these technical challenges by removing the need to assign a phone number to the IVR component. In that way, the first IVR component, such as the one the caller calls initially, may still be assigned a phone number, but the second level IVR component may not be assigned a phone number and can simply be accessed using any identification.

In an example embodiment, the state of a call is persisted by the second level IVR in a file, so that when the call is transferred the new call is able to pick up the state and continue. In one example embodiment, this file is a Javascript Object Notation (JSON) file. All variables stored in memory are stored in the JSON file in an effective way. This aids with what might have been a technical issue in that IVRs are free-form and administrators can create and collect many different types of variables—essentially any variable the administrator wishes. Rather than storing these variables in various places in memory, they are put in a structure like a list in the JSON file. All variables defined for the IVR can be referenced in the list.

In this manner, the second level IVR component is able to take a call from one compiled application and transfer it to another compiled application with no interruption, no clicks, and no dialing of a phone number.

Additionally, the agent application is able to receive information about what has happened on the IVR side through the JSON file. For example, during the collection of a credit card number via a specialized credit card collection IVR, the caller may be struggling with entering a number or not hitting a pound key when prompted or similar issues. The agent will then be able to see these struggles when accessing the JSON file (assuming that the data is not kept private or masked out by the IVR), allowing the agent to then help the caller enter the credit card number correctly.

During the credit card collection IVR, the agent can no longer hear the call (so, for example, the agent cannot determine which digits have been entered by deducing their tones). The IVR can send update messages to the agent, letting the agent know where the caller has proceeded through the IVR, and the agent can see the JSON file.

In some example embodiments, the second level IVR is embodied in a system where an IVR component is decoupled from a voice media server, which allow the voice media server to be geographically placed in a location most beneficial to keep digital voice file transmission to a minimum (thus saving bandwidth), while allowing the IVR component to be geographically located anywhere without negatively impacting the bandwidth usage. An additional benefit is that by decoupling the IVR component from the voice media server, the IVR component can be implemented in a way that lets it work with multiple redundant voice media servers simultaneously, allowing one of the voice media servers to become unavailable without impacting service. Furthermore, decoupling the IVR component from the voice media server also allows an implementation where certain IVR scripts may be used to obtain confidential or sensitive data from users without sharing this data with call agents or otherwise storing the data with the voice data stored by the voice media server, preserving privacy and/or anonymity. Indeed, the second level IVR can be used for the confidential or sensitive data while the first level IVR is used for non-confidential and non-sensitive data.

In other example embodiments, the second level IVR is embodied in a system where an IVR component is integrated in the voice media server.

FIG. 1 is a block diagram illustrating a system 100 for contact center deployment in accordance with an example embodiment. Here, rather than integrate an IVR component 102 within a media server 104 at a managed service provider data center 106, the IVR component 102 is integrated in a call control service 108 at a central data center 110.

Second level IVR component 107 then implements one or more second level IVR scripts. While IVR component 102 has a phone number attached to it, second level IVR component 107 does not. Rather, it has an internally prescribed reference identification. For example, transferring a call to a script from the IVR component 102 may involve transferring it to phone number "555-1234," while transferring a call to a script from the second level IVR component 107 may involve transferring it to identification "credit card script."

The actual call, when transferred to the script from the second level IVR component 107, merely transposes in software the call from the script from the IVR component 102 to the script from the second level IVR component 107 instantly, without audible "clicks" in the caller's ear because the actual media has not moved from the media server where it originally was.

The managed service provider data center 106 includes a voice switch 112 that connects to a public switched telephone network (PSTN) 114. Calls are received at the voice switch 112 from the PSTN 114 and sent to the media server 104. In some example embodiments, calls are also sent to a Session Initiation Protocol (SIP) Proxy high availability cluster 116. The SIP Proxy high availability cluster 116 controls what may be multiple instances of the media server 104, for redundancy purposes (which may include automatic failover, which means that if one instance of the media server 104 goes down, another can take over without human intervention and without loss of service). More particularly, command and control for media servers may be replicated across singular or multiple communication service provider deployments. Additional file services 118, such as retrieval of stored calls, may also be provided from the managed service provider data center 106.

The media server 104 (which may include multiple instances of the media server in redundant configurations) may then connect remotely with the call control service 108 at the central data center 110, via the Internet 120. In an example embodiment, this connection may be via an IP Security (IPSec) Virtual Private Network (VPN) tunnel. The IVR component 102 and the second level IVR component 107 within the call control service 108 can send one or more scripts to the media server 104, which can run them when appropriate during a voice call. These scripts may be triggered when the media server 104 detects certain events in the voice call, in accordance with the IVR script being utilized. For example, one such event may be the establishment of the call itself (i.e., when the user first calls and the voice switch picks up the call), at which point an automated script may be executed giving a list of menu options for the user to choose from. Alternatively, the scripts may be triggered based on events from a contact center anywhere graphical user interface (CCA GUI) 122, which may be connected to an agent phone 124 that a human agent uses during a call to speak with the user. Communication between the CCS 102 and the CCA GUI 122 may be handled via a web service 126.

Prompts for the IVR scripts may pushed from the IVR component 102 and/or second level IVR component 107 to the media server 104 and stored at the media server 104. Text to speech processing may be performed by the media server 104 and pushed to the IVR component 102, where the text from the user's voice can be used to process the appropriate IVR script. In an example embodiment, an Event Socket Layer (ESL) 128 is used for this purpose. More particularly, the ESL 128 may implement calls to an event socket on the media server 104, which implements an event socket library containing various functions that can be activated by the calls. Example functions include setting a log level (which issues informative messages related to the ESL 128), instantiating a new event object, and initializing a new instance of an ESL connection.

Events triggered during the IVR scripts can then be sent to the call control service 108, which can use them for tracking, reporting, and call control itself. Specifically, call control service 108 may offer a schedule manager to schedule live agent work hours and breaks and generate reports, initiate call recording and screen recording capabilities to monitor agent behavior, track and view agent chat logs, and provide real-time dashboard with information about current and past calls.

The IVR component 102 may also connect to a web application 130. The web application 130 may provide an interface for a user to draw or otherwise create an IVR. This may be a graphical interface rendered on a client device that communicates with the web application 130. The user may be able to click a button that gets the created call flow into an XML or similar file representing the created IVRs/IVR scripts. Thus, it is these XML or similar files that may be transmitted to the media server 104.

In an example embodiment, the media server 104 may actually be a full-service media server 104, which has the capability to provide IVR services using an integrated IVR component, but whose IVR services and/or IVR component have been disabled or otherwise are not utilized. In this manner, an existing media server 104 may be repurposed for use with a decoupled IVR component 102 without needing to completely redesign the media server 104.

In a further example embodiment, the media server 104 may actually comprise a plurality of media servers, each acting as a backup to the other. All the media servers may either store the IVR scripts from the IVR component 102 or may access a shared database storing the IVR scripts. One of these multiple media servers may be utilized as a primary media server at runtime, until and unless it becomes unavailable (either through technical issues with the primary media server itself or with the communications link to the primary media server), at which point the system 100 switches over to one of the backup media servers.

Furthermore, in an example embodiment, the IVR component 102 may be one of a plurality of IVR components 102, each acting as a backup to one another. Indeed, in an example embodiment, there are 3 redundant IVR components 102 for each media server 104. The same can be true of second level IVR component 107. The decoupling of the IVR component 102 and the media server allows for this type of multiple redundancies, where there are multiple IVR components capable of communicating with multiple media servers, thus compensating for any one component/server going down or otherwise becoming unavailable due to technical or other issues.

When updates are needed, the decoupling of the IVR component 102 from the media server 104 allows for the IVR component 102 and/or second level IVR component 107 to be updated independently from the media server 104, thus simplifying updates and making them less risky operationally.

Voice media does not flow back to the central data center 110, thus not introducing quality degrading "hops" to the voice calls, while the voice real-time-processing stays local to the service provider network, including the managed service provider data center 106.

In an example embodiment, the media server 104 may actually be a full-service media server 104, which has the capability to provide IVR services using an integrated IVR component, but whose IVR services and/or IVR component have been disabled or otherwise are not utilized. In this manner, an existing media server 104 may be repurposed for use with a decoupled IVR component 102 without needing to completely redesign the media server 104.

Figure 2:
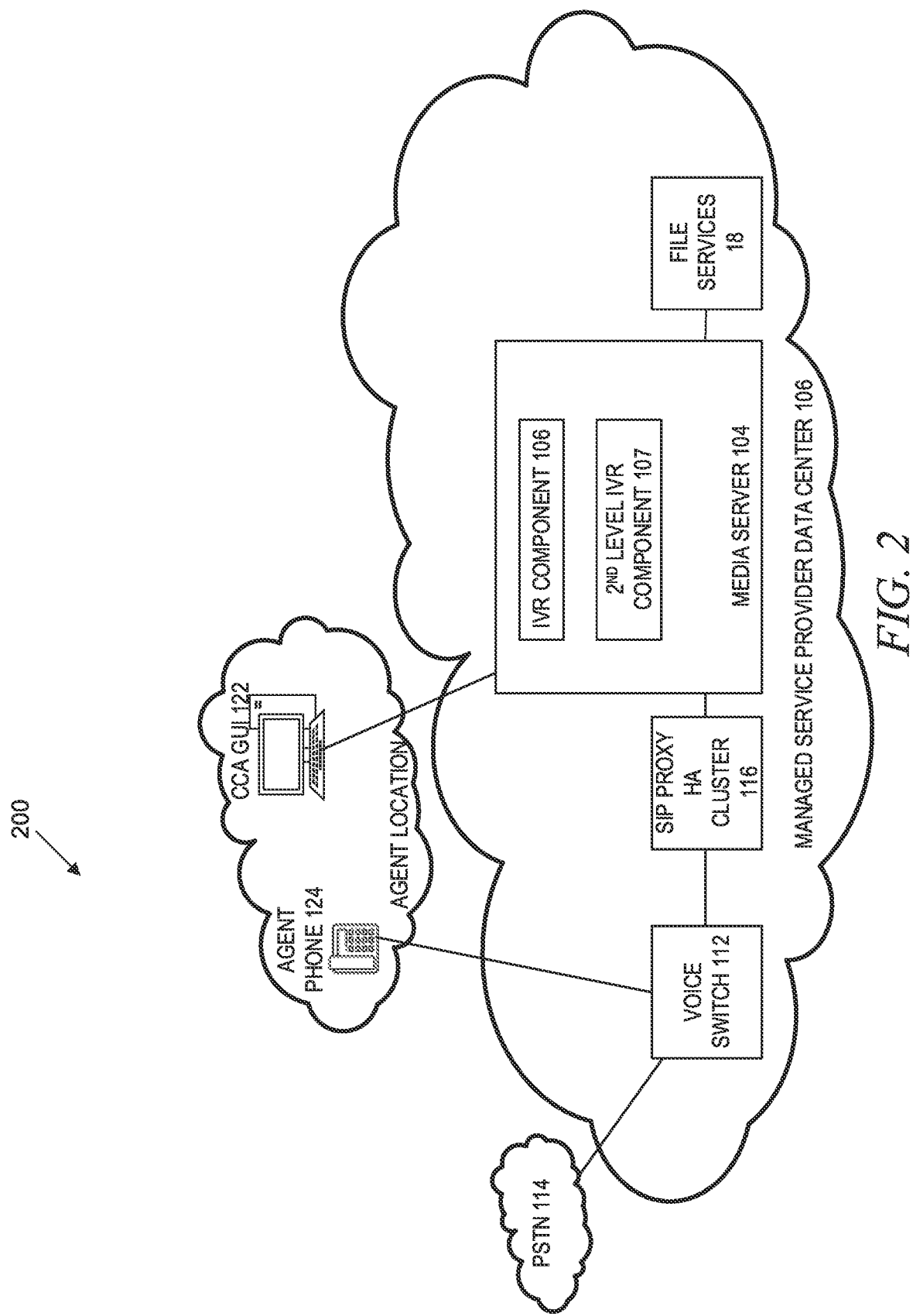
FIG. 2 is a block diagram illustrating a system for second level IVR distribution, in accordance with an example embodiment.

As discussed briefly earlier, it is not mandatory that the second level IVR be implemented in a system where an IVR component is decoupled from a media server. FIG. 2 is a block diagram illustrating a system 200 for second level IVR distribution, in accordance with an example embodiment. Here, rather, both IVR component 202 and second level IVR component 204 are integrated within a media server 206 at a managed service provider data center 208.

Second level IVR component 204 then implements one or more second level IVR scripts. While IVR component 202 has a phone number attached to it, second level IVR component 204 does not. Rather, it has an internally prescribed reference identification. For example, transferring a call to a script from the IVR component 202 may involve transferring it to phone number "555-1234," while transferring a call to a script from the second level IVR component 204 may involve transferring it to identification "credit card script."

The actual call, when transferred to the script from the second level IVR component 204, merely transposes in software the call from the script from the IVR component 202 to the script from the second level IVR component 204 instantly, without audible "clicks" in the caller's ear because the actual media has not moved from the media server where it originally was.

The managed service provider data center 208 includes a voice switch 210 that connects to a public switched telephone network (PSTN) 212. Calls are received at the voice switch 210 from the PSTN 212 and sent to the media server 206. In some example embodiments, calls are also sent to a Session Initiation Protocol (SIP) Proxy high availability cluster 214. The SIP Proxy high availability cluster 214 controls what may be multiple instances of the media server 206, for redundancy purposes (which may include automatic failover, which means that if one instance of the media server 206 goes down, another can take over without human intervention and without loss of service). More particularly, command and control for media servers may be replicated across singular or multiple communication service provider deployments. Additional file services 216, such as retrieval of stored calls, may also be provided from the managed service provider data center 208.

The IVR component 202 and the second level IVR component 204 can run IVR scripts when appropriate during a voice call. These scripts may be triggered when the media server 206 detects certain events in the voice call, in accordance with the IVR script being utilized. For example, one such event may be the establishment of the call itself (i.e., when the user first calls and the voice switch picks up the call), at which point an automated script may be executed giving a list of menu options for the user to choose from. Alternatively, the scripts may be triggered based on events from a contact center anywhere graphical user interface (CCA GUI) 210, which may be connected to an agent phone 212 that a human agent uses during a call to speak with the user.

IVR scripts are essentially flows designed by an administrator to guide users through one or more menu selections and collect and handle the selections. IVR scripts may be designed using a graphical user interface using IVR script creation software, such as an IVR studio application, which may be implemented in web application 126. The IVR studio application is a visual environment where a user can design IVR scripts. An IVR script provides full or partial automation of telephone events that may otherwise be performed by a live person, whereas the IVR script is a set of instructions written for a voice response system that tells it how to carry out an automated event. The IVR script defines the call flow and determines what callers hear and how callers respond to the system.

Figure 3:
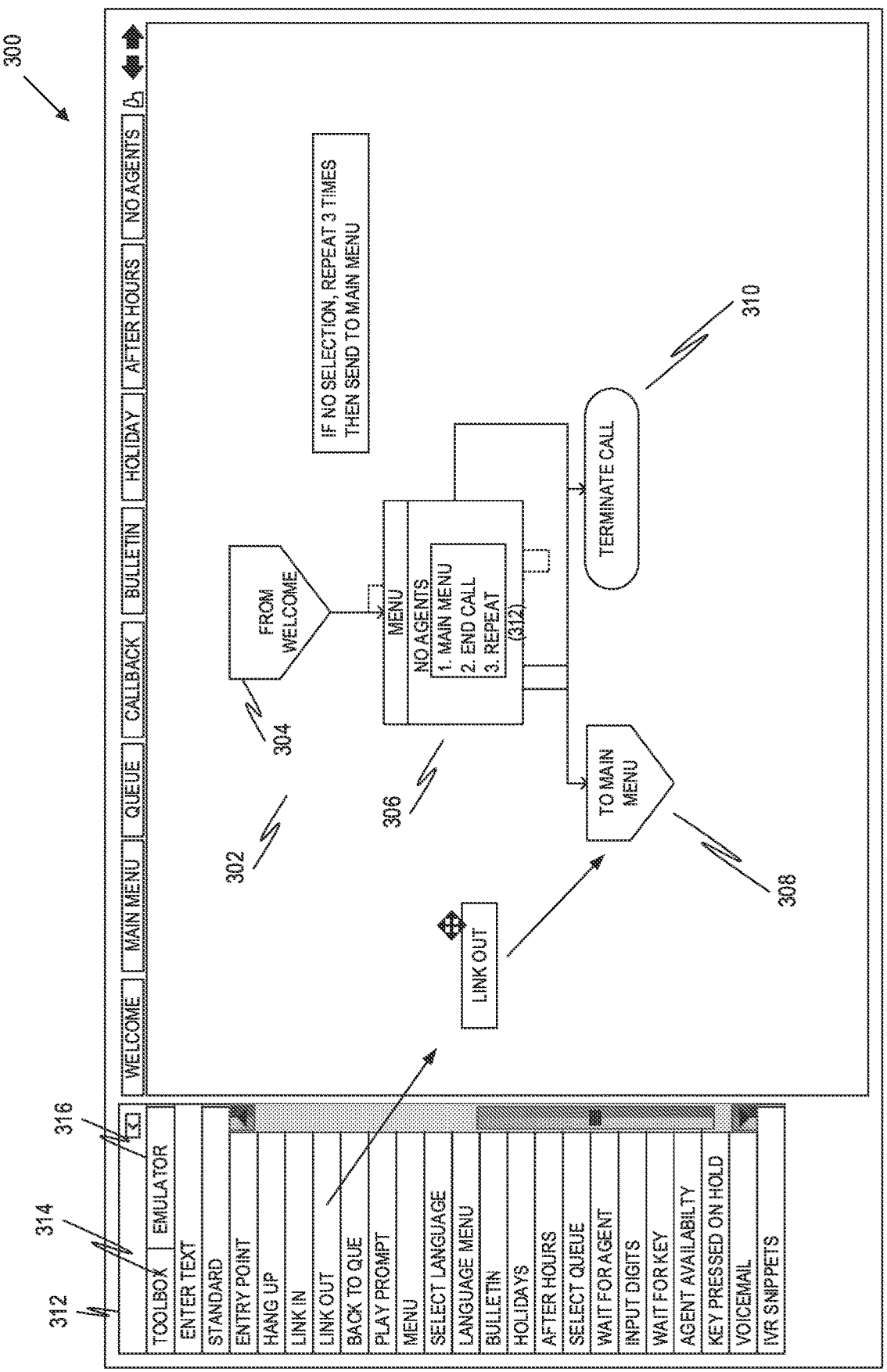
FIG. 3 is a screen capture illustrating a GUI of an IVR studio application, in accordance with an example embodiment.

FIG. 3 is a screen capture illustrating a GUI 300 of an IVR studio application, in accordance with an example embodiment. The script 302, comprises a sequence of nodes 304, 306, 308, 310 defining actions, as well as optionally one or more decision blocks, which decide which of multiple paths to execute in the script 302. Arrows connecting the icons point out the flow direction, with each icon representing a phone business function. Navigation page 312 comprises two tabs: toolbox 314 and emulator 316. Toolbox 314 when selected, lists all business function icons that can be added to the IVR script. Example include comment, entrypoint, hang up, link in, link out, back to queue, play prompt, menu, select language, language menu, bulletin, holidays, after hours, select queue, wait for agent, input digits, wait for key, agent availability, key pressed on hold, voicemail, callback, transfer, set variable, conditional, conditional (range), speak phrase, bind phrase, wait time in queue, rule based transfer, queue geo-routing, Representational State Transfer (REST) web services call, set property, and checkpoint.

Comment is a free form comment field. Entrypoint is a beginning of an IVR script—the point where a phone number is dialed and callers enter the beginning of the IVR script. Hang up is the end of an IVR script, where the connection to the caller is terminated. Link in is a call flow continuation from another page in an IVR script. Link out indicates the need to go to a different page in the design.

Back to queue is used to indicate the caller has made a selection to leave the queue, but they should be sent back to the originating queue. Play prompt places a stand-alone (non-menu) prompt in a call flow. Menu indicates a caller selection within the call flow outside of a queue. Select language indicates the language selected. Language menu is the menu presented to callers to select their language of choice.

Bulletin indicates emergency messages that can be turned off and on by the administrator at will. Holidays is a standard system check that is triggered when a holiday is configured in an administrator portal. After hours is a standard system check that is triggered when a call arrives outside of business hours.

Select queue sends the caller to a specific queue. Wait for agent is where uses configure an in-queue mix of message and music entertainment for callers on hold. Input digits is a function that triggers the caller to input digits. Wait for key is a standard system check that is triggered when a single digit is pressed on the telephone keypad. Agent availability is a standard system check that is triggered if for some unplanned reason all agents have logged out and the queues are not manned.

Key pressed on hold is where caller-selected options while in queue are configured. Voicemail is a function that triggers the caller to leave a voicemail. Callback is a final step in a callback template, which triggers the callback to be registered in the database and queued for action by an agent. Transfer is a function that will send a caller out of the IVR script to a specific phone number.

Set variable sets the value of a variable. Conditional is a standard system check that is triggered when a variable value is compared with a set defined value using an operator. Conditional (range) is a standard system check that is triggered when a variable value is compared with a range of values. Speak phrase places a spoken phrase (text to speech) in the call flow.

Bind phrase allows binding of phrases to variables. Wait time in queue is where the wait time in the queue is calculated and stored to a variable. Rule based transfer checks a geo routing ruleset of a key and returns the selected queue or transfer destination if found, which is used for dynamic rules based routing.

Queue geo-routing automatically checks a database for an appropriate geo-routing rule, which allows for distribution of calls based on caller location (to, for example, load balance queues). REST Web Service call is used to access data from or send data to an external source. Set property is used to set values in and control other business functions. Checkpoint is a point in the IVR script to log a count of a checkpoint, for reporting purposes.

The emulator 316 is selected when one wants to test an IVR script. It runs the script in an emulated environment to ensure that it is working properly.

Figure 4:
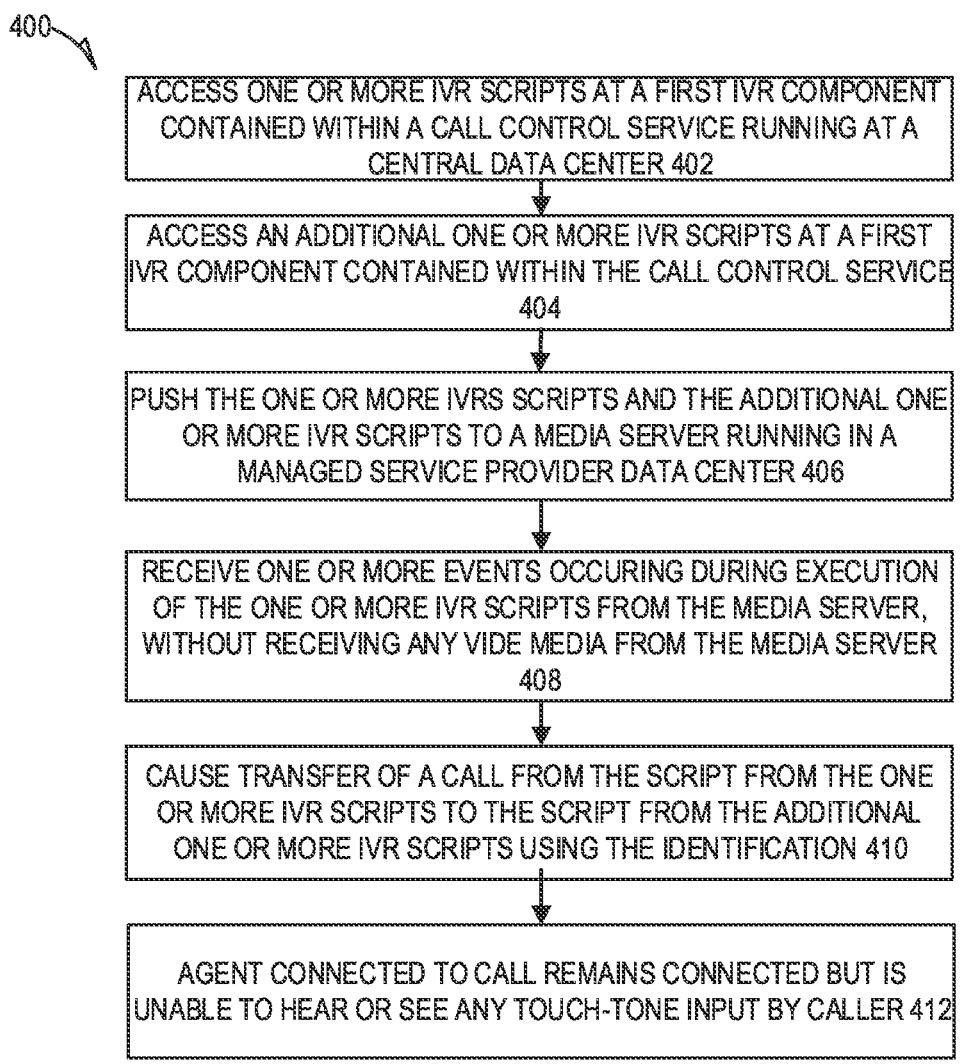
FIG. 4 is a flow diagram illustrating a method for running second-level IVR scripts, in accordance with an example embodiment.

FIG. 4 is a flow diagram illustrating a method 400 for running second-level IVR scripts, in accordance with an example embodiment. At operation 402, one or more IVR scripts are accessed at a first IVR component contained within a call control service running at a central data center at a first geographic location. The one or more IVR scripts, when executed, perform a flow of automatic voice prompts to callers on phone calls. The first IVR component may be assigned a phone number to which calls may be made or transferred.

At operation 404, an additional one or more IVR scripts are accessed at a second IVR component contained within the call control service. The additional one or more IVR scripts, when executed, perform an additional flow of automatic voice prompts to callers on phone calls. The second IVR component is assigned an identification to which calls may be transferred but not assigned a phone number to which calls may be made or transferred.

At operation 406, the one or more IVR scripts and the additional one or more IVR scripts are pushed to a media server running in a managed service provider data center at a second geographic location. At operation 408, one or more events occurring during execution of the one or more IVR scripts are received from the media server, without receiving any voice media from the media server, the one or more events including a transfer from a script from the one or more IVR scripts to a script from the additional one or more IVR scripts. At operation 410, the call control service causes transfer of a call from the script from the one or more IVR scripts to the script from the additional one or more IVR scripts using the identification. At operation 412, during execution of the script from the additional one or more IVR scripts, an agent connected to the call remains connected but is unable to hear or see any touch-tone input by the caller.

Figure 5:
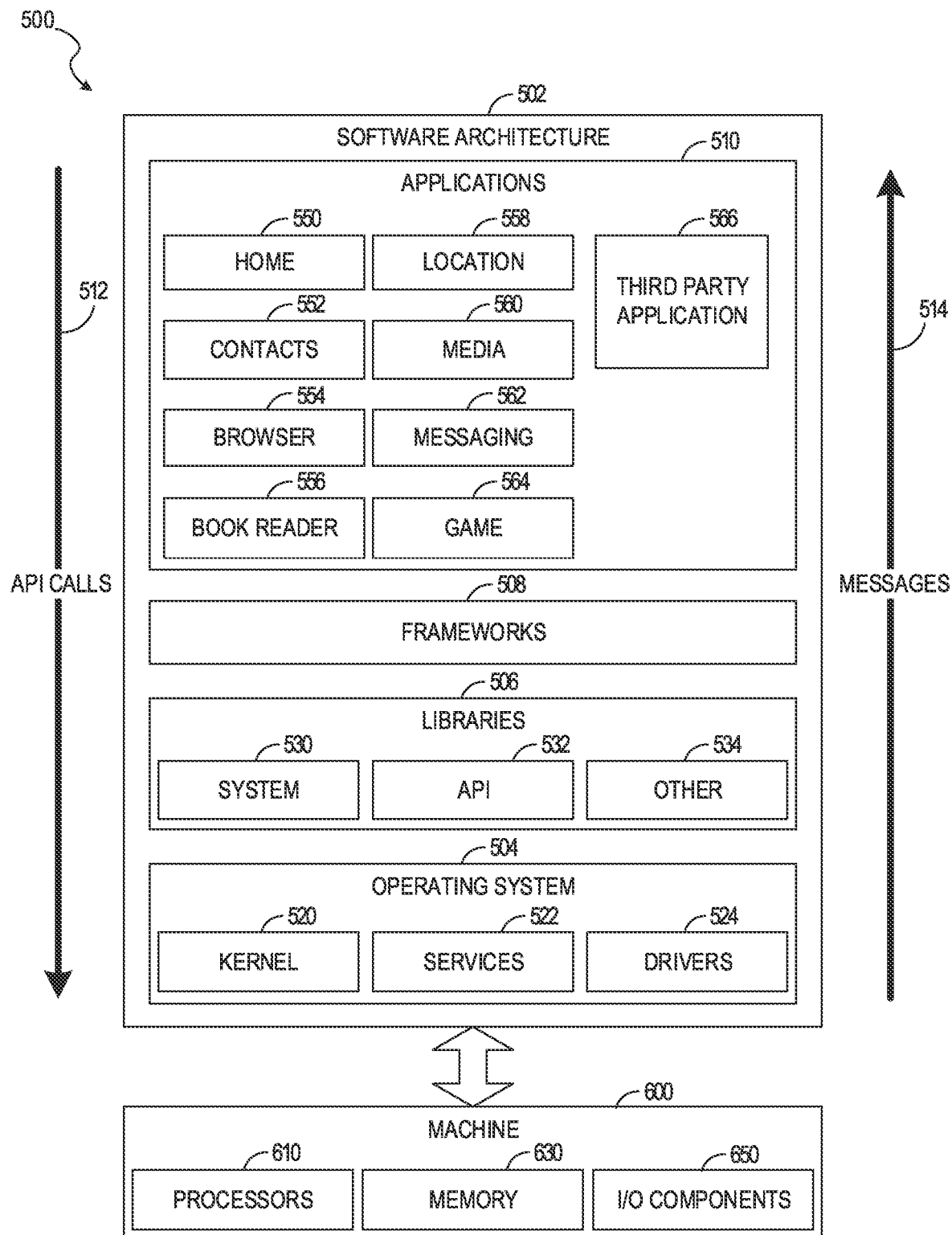
FIG. 5 is a block diagram illustrating a software architecture, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, Bluetooth® or Bluetooth® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the Android™ or iOS™ software development kit (SDK) by an entity other than the vendor of the particular platform) may be mobile software running on a mobile operating system such as iOS™, Android™, Windows® Phone, or another mobile operating system. In this example, the third-party application 566 can invoke the API calls 512 provided by the operating system 504 to facilitate functionality described herein.

Figure 6:
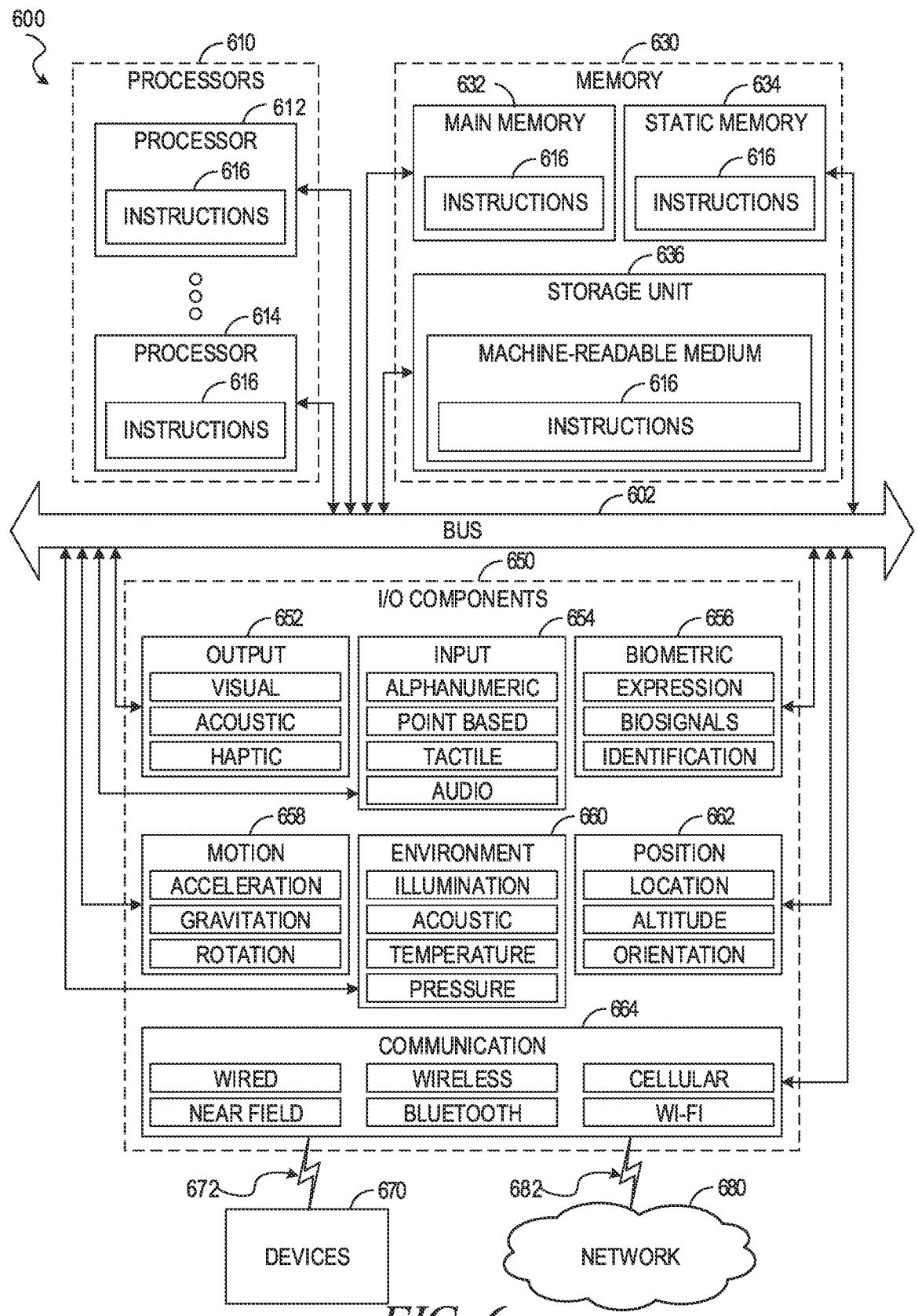
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors 612 (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor), multiple processors 610 with a single core, multiple processors 610 with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to the processors 610. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
a first interactive voice response (IVR) component implementing one or more IVR scripts, the one or more IVR scripts, when executed, performing a flow of automatic voice prompts to callers, the first IVR component assigned a phone number to which calls may be made or transferred; and
a second IVR component coupled to the first IVR component, the second IVR component implementing an additional one or more IVR scripts, the additional one or more IVR scripts, when executed, performing another flow of automatic voice prompts to callers, the second IVR component assigned an identification to which calls may be transferred.

2. The system of claim 1, wherein the first IVR component and the second IVR component are integrated in a call control service operating on a central data center located at a first geographic location, the first IVR component and the second IVR component configured to transmit the one or more IVR scripts and the additional one or more IVR scripts to a media server running in a managed service provider data center at a second geographic location.

3. The system of claim 1, wherein the first IVR component and the second IVR component are integrated in a media server running in a managed service provider data center.

4. The system of claim 2, wherein the managed service provider data center further comprises a voice switch that connects to a public switched telephone network (PSTN).

5. The system of claim 4, wherein calls received via the PSTN are sent to a Session Initiation Protocol (SIP) proxy high availability cluster that controls multiple instances of the media server.

6. The system of claim 2, wherein the one or more IVR scripts are pushed to the media server via an event service layer (ESL).

7. The system of claim 1, wherein the first IVR component includes a web application that provides a graphical user interface for a user to create the one or more IVR scripts.

8. A method comprising:
accessing, at a first IVR component contained within a call control service running at a central data center at a first geographic location, one or more IVR scripts, the one or more IVR scripts, when executed, performing a flow of automatic voice prompts to callers on phone calls, the first IVR component assigned a phone number to which calls may be made or transferred;

accessing, at a second IVR component contained within the call control service, an additional one or more IVR scripts, the additional one or more IVR scripts, when executed, performing an additional flow of automatic voice prompts to callers on phone calls, the second IVR component assigned an identification to which calls may be transferred;

pushing the one or more IVR scripts and the additional one or more IVR scripts to a media server running in a managed service provider data center at a second geographic location;

receiving, from the media server, one or more events occurring during execution of the one or more IVR scripts, without receiving any voice media from the media server, the one or more events including a transfer from a script from the one or more IVR scripts to a script from the additional one or more IVR scripts; and causing transfer of a call from the script from the one or more IVR scripts to the script from the additional one or more IVR scripts using the identification.

9. The method of claim 8, wherein the script from the additional one or more IVR scripts is one that collects confidential information from a user, and an agent connected to the call is not disconnected from the call while the script from the additional one or more IVR scripts executes but is unable to hear or see any touch-tone input from the caller during the execution of the script from the additional one or more IVR scripts.

10. The method of claim 8, wherein the managed service provider data center further comprises a voice switch that connects to a public switched telephone network (PSTN).

11. The method of claim 10, wherein calls received via the PSTN are sent to a Session Initiation Protocol (SIP) proxy high availability cluster that controls multiple instances of the media server.

12. The method of claim 8, wherein the one or more IVR scripts are pushed to the media server via an event service layer (ESL).

13. The method of claim 8, wherein the first IVR component includes a web application that provides a graphical user interface for a user to create the one or more IVR scripts.

14. The method of claim 8, wherein the transfer occurs without audible clicks.

15. A non-transitory machine-readable storage medium comprising instructions, which, when implemented by one or more machines, cause the one or more machines to perform operations comprising:

accessing, at a first IVR component contained within a call control service running at a central data center at a first geographic location, one or more IVR scripts, the one or more IVR scripts, when executed, performing a flow of automatic voice prompts to callers on phone calls, the first IVR component assigned a phone number to which calls may be made or transferred;

accessing, at a second IVR component contained within the call control service, an additional one or more IVR scripts, the additional one or more IVR scripts, when executed, performing an additional flow of automatic voice prompts to callers on phone calls, the second IVR component assigned an identification to which calls may be transferred;

pushing the one or more IVR scripts and the additional one or more IVR scripts to a media server running in a managed service provider data center at a second geographic location;

receiving, from the media server, one or more events occurring during execution of the one or more IVR scripts, without receiving any voice media from the media server, the one or more events including a transfer from a script from the one or more IVR scripts to a script from the additional one or more IVR scripts; and causing transfer of a call from the script from the one or more IVR scripts to the script from the additional one or more IVR scripts using the identification.

16. The non-transitory machine-readable storage medium of claim 15, wherein the script from the additional one or more IVR scripts is one that collects confidential information from a user, and an agent connected to the call is not disconnected from the call while the script from the additional one or more IVR scripts executes but is unable to hear or see any touch-tone input from the caller during the execution of the script from the additional one or more IVR scripts.

17. The non-transitory machine-readable storage medium of claim 15, wherein the managed service provider data center further comprises a voice switch that connects to a public switched telephone network (PSTN).

18. The non-transitory machine-readable storage medium of claim 17, wherein calls received via the PSTN are sent to a Session Initiation Protocol (SIP) proxy high availability cluster that controls multiple instances of the media server.

19. The non-transitory machine-readable storage medium of claim 15, wherein the one or more IVR scripts are pushed to the media server via an event service layer (ESL).

20. The non-transitory machine-readable storage medium of claim 15, wherein the first IVR component includes a web application that provides a graphical user interface for a user to create the one or more IVR scripts.

* * * * *